Nov. 11, 1930.　　　H. J. OUTCELT　　　1,781,075
BUTTER CUTTING MACHINE
Filed Aug. 19, 1929　　2 Sheets-Sheet 1
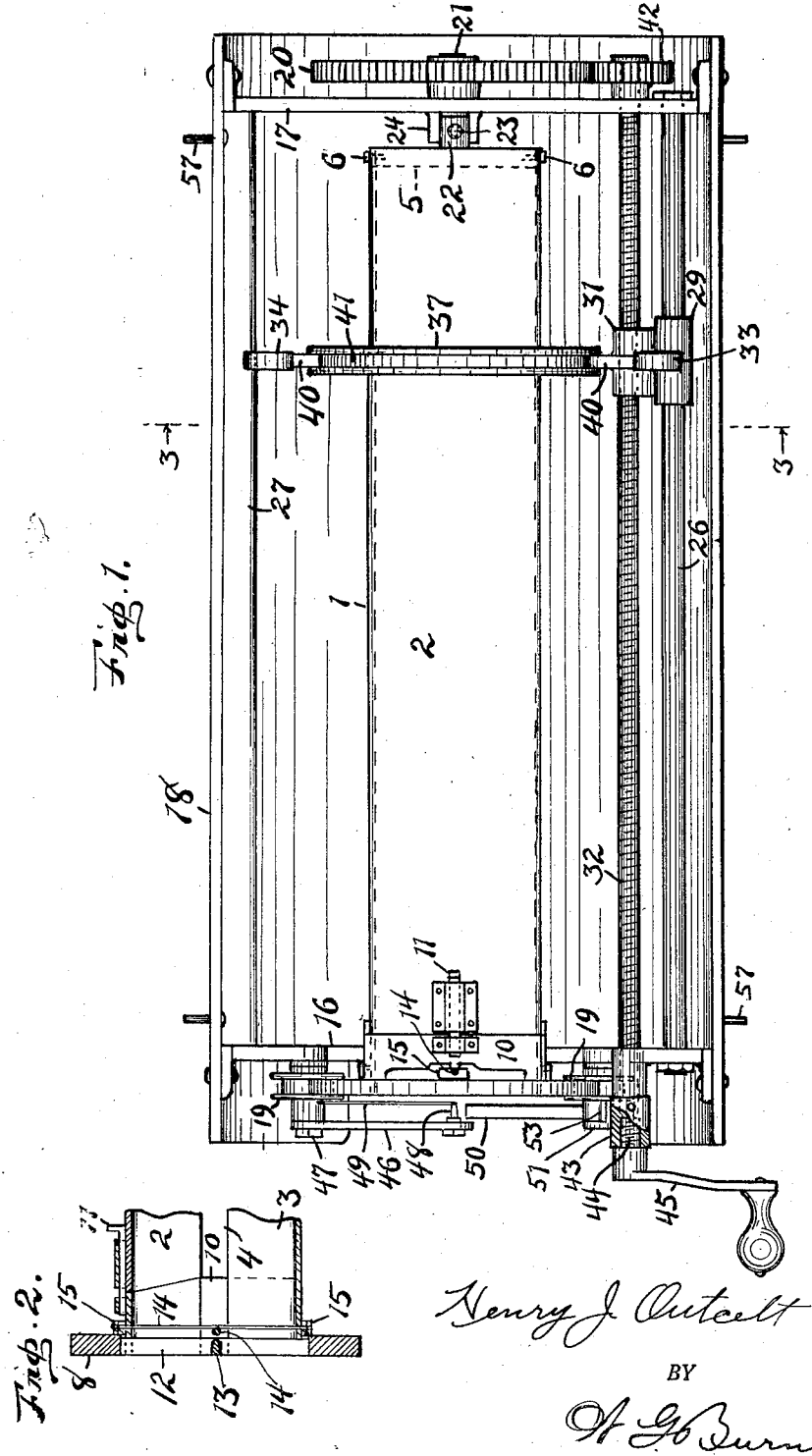
Henry J. Outcelt INVENTOR.
BY
A. G. Burns ATTORNEY.

Nov. 11, 1930.  H. J. OUTCELT  1,781,075
BUTTER CUTTING MACHINE
Filed Aug. 19, 1929  2 Sheets-Sheet 2

Henry J. Outcelt INVENTOR.
BY
A. G. Burns ATTORNEY.

Patented Nov. 11, 1930

1,781,075

UNITED STATES PATENT OFFICE

HENRY J. OUTCELT, OF WARSAW, INDIANA

BUTTER-CUTTING MACHINE

Application filed August 19, 1929. Serial No. 386,746.

This invention relates to improvements in a butter cutting machine for use in forming pats from a bar of butter, and the object thereof is to provide apparatus for portioning butter whereby the portions are made and delivered singly and in successive order as required for use; to provide in the apparatus a container for holding a supply of butter to be portioned, which container may be readily opened to receive supplies of butter, or removed from the apparatus to be cleansed; and to provide an apparatus for portioning butter rapidly, which is simple in construction and easily operated.

These objects are accomplished by the construction illustrated in the accompanying drawings, in which:—

Fig. 1 is a plan view of an apparatus embodying the invention, a portion being broken away;

Fig. 2 is a fragmentary vertical section of one end of the butter container;

Figure 3:
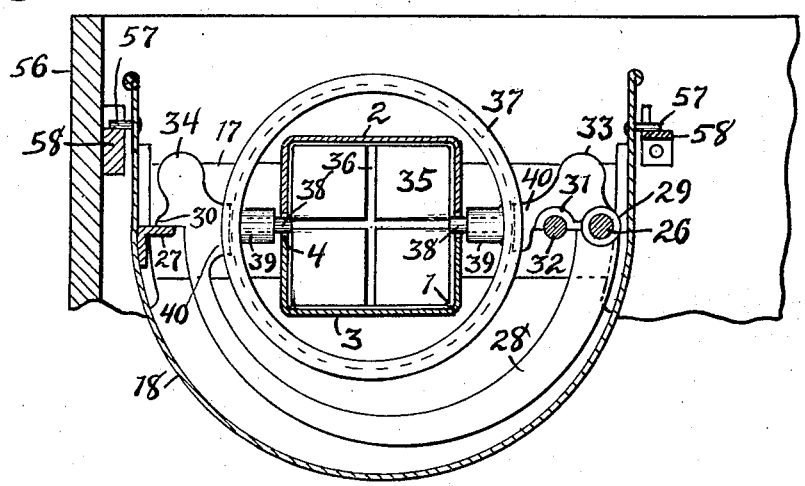
Fig. 3 is a transverse section of the appliance on the line 3—3 of Fig. 1.
Figure 4:
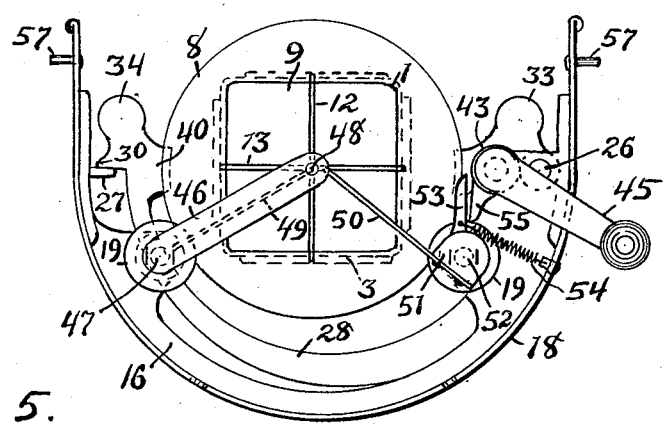
Fig. 4 is a front end elevation of the appliance.
Figure 5:
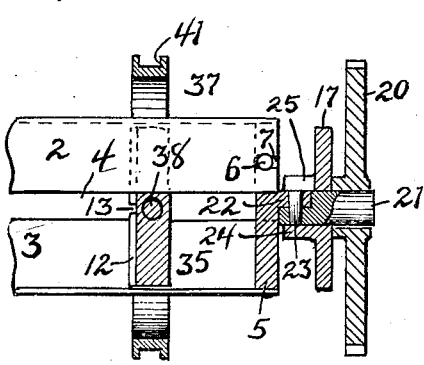
Fig. 5 is a fragmentary elevation of the rear end of the butter container and its driving gear, parts being in section.

The invention consists of a horizontally disposed container 1 in which butter to be portioned is deposited. The container is formed of two channel shaped members 2 and 3, disposed oppositely and spaced apart so that the container has longitudinal openings 4 between the corresponding sides of said members. The rear end of the container (Figs. 1 and 5) has a head 5 to which the member 3 is permanently attached, and to which the member 2 is removably secured, there being studs 6 projecting laterally from the head and corresponding notches 7 in the sides of the member 2 for the reception of the respective studs whereby said member is held in connection with the head. The front end of the container (Figs. 1 and 2) has a circular flange 8 having a central square opening 9 therein corresponding in shape with the head 5, and to which flange the front end of the channel member 3 is permanently attached. The flange 8 has projecting from its inner face a U-shaped extension 10 between the sides of which the corresponding end of the channel member 3 is secured, the forward end of the channel member 2 being removably attached to said extension by means of a fastener 11 by which the removable member 2 is held in place in connection with the container. Fixed in the flange 8 are two parting blades 12 and 13 disposed at right angles to each other and intersecting with each other at a point in line with the axis of the container. Also, adjacent the inner edge of each of said blades and alined therewith is disposed a wire 14, which wires are secured at their opposite ends by corresponding fasteners 15. The wires thus disposed cause a bar of butter (not shown) as it is extruded from the container, to be longitudinally severed into equal parts, and the blades 12 and 13 act to maintain the severed parts separate from each other.

A supporting means is provided for the container and consists of two frames 16 and 17 that are mounted in connection with a drip-pan 18 adjacent the corresponding ends thereof. The frame 16 has mounted thereon a pair of grooved rollers 19 upon which rollers the flange 8 of the container is disposed. The frame 17 has mounted in connection therewith a gear 20 provided with a shaft 21 the inner end of which shaft has spliced relation with a stud 22 that projects from the head 5, there being a pin 23 fixed in the stud and extending loosely and transversely into the spliced end of the shaft. The frame 17 has a boss 24 in which the spliced connection between the stud and shaft revolves, said boss having a slot 25 in its top to permit the stud to be lifted upwardly out of connection with the shaft by raising the container when the removable member 2 thereof is in uppermost position. The bottom of the stud 24 underlies the spliced connection between the stud and shaft and prevents the stud from dropping out of connection with the shaft during rotation of the container. Thus, when the container is in position and the gear is revolved, the container is rotated accordingly.

The frames 16 and 17 have in connection therewith a longitudinally disposed guide consisting of a rod 26 that extends parallel with the axis of the container and adjacent one side of the pan, and upon the opposite side of the pan is an inwardly extending longitudinally disposed rail 27, upon which rod and rail is mounted a sliding bracket 28, one end of which has a bearing 29 through which the rod loosely extends and the opposite end of the bracket having a lug 30 that overhangs the rail 27 and has sliding movement thereon. The bracket has also adjacent its bearing 29 a semicircular threaded lug 31 that overlies and has engaging connection with a feed-screw 32 that is rotatably mounted in the frames 16 and 17. The bracket has pivotal movement on the rod 26 when the opposite end of the bracket is raised from the rail 27, whereupon the threaded lug 31 is moved out of engaging relation with the feed-screw, and when the bracket is thus raised, longitudinal movement of the bracket on the rod 26, independent of the feed-screw, is permitted, there being a knob 33—34 projecting upwardly from each end of the bracket 28 by which the bracket is manipulated.

Within the container 1 is provided a plunger 35 which is longitudinally movable therein, the front face of the plunger having grooves 36, and an externally grooved ring 37 encompasses the container and has pivotal connection with the plunger 35, there being a pin 38 extending from each side of the plunger through the corresponding slot 4 in the container and extending into a lug 39 on the ring opposite the opening. The ring is engaged by the bracket 28 which has an inwardly extending projection 40 at each end thereof that extends loosely into the groove 41 of the ring 37, so that as the bracket 28 is moved longitudinally, the ring 37 and plunger 35 connected therewith are correspondingly moved.

On the rear end of the feed-screw 32 is fixed a pinion 42 that meshes with the gear 20, and upon the opposite end of the feed-screw is fixed a head 43 which is internally threaded to receive a threaded shank 44 of a crank 45. The feed-screw is rotated upon turning of the crank in one direction, and said crank becomes disconnected from the head 43 upon being rotated in the opposite direction as its shank becomes unscrewed from said head when the crank is thus turned.

An arm 46 is rigidly positioned upon a stud 47 that extends from the frame 16, one end of said arm being provided with a stud 48 that is alined with the axis of the container in front of the parting blades, at the intersection thereof, and a stationary slicing wire 49 is secured at one end to said stud and at its opposite end to the hub of the arm 46.

A stripper is provided for the butter pats as they are sliced by the wire 49 from the butter bar, which stripper consists of a tongue 50 fixed at one end upon an oscillating block 51 that is pivotally supported upon a stud 52 which projects from the frame 16, the block having a radially extending finger 53 engaged by a tension spring 54 whereby the stripper is held in normal position. Said finger extends into the path of a lug 55 on the head 43 so that as the feed-screw and said head are rotated, upon operation of the crank 45, said finger is engaged by said lug and the stripper thereby actuated in opposition to the tension of the spring. In this manner the tongue 50 is caused to swing transversely with respect to the container adjacent the discharge end thereof.

The appliance is mounted in a cooling cabinet 56, there being studs 57 projecting outwardly from the pan 18 that engage supports 58 fixed in the cabinet so that the appliance is removably supported thereby within the cabinet.

In operating the invention, the bracket 28 is swung upwardly so that its threaded lug is disengaged from the feed-screw, and then moved to the rear end of the container and replaced in its normal position in engaging relation with the screw by lowering the bracket so that its lug rests upon the rail 47. The container member 2 is then removed by opening the fastener 11, raising its corresponding end and sliding it forwardly so that the opposite end of said member is withdrawn from connection with the head 5. Bars of butter are then deposited endwise in alinement with each other in the container, which container is then closed by replacing the removable member 2. Upon operation of the crank so as to revolve the feed-screw 32, the plunger 35, through the medium of the bracket 28 and ring 37, forces the butter endwise in the container, causing it to become extruded through the discharge end thereof and become severed longitudinally into parts by the cross-wires 14 and past the parting blades 12 and 13. As the feed-screw is turned, rotary movement is concurrently imparted to the container through the medium of the pinion 42 and gear 20. During rotation of the container and the extrusion of the severed portions of the butter bar therefrom, said portions, in successive order, become sliced transversely by the stationary wire 49 so that a corresponding series of pats of butter are removed from the extruded ends of said portions. As each pat is sliced free from its portion, the tongue of the stripper swings into contact with it which prevents the severed pat from clinging to the end of the container or the adjacent pat being sliced.

A feature of the invention is the provision for the removal of the container bodily from its supports and driving connection, which permits of the cleansing of the container without inconvenience. This is accomplished by turning the crank to such position that the container member 2 is uppermost, whereupon said container and the ring 37 with the plunger attached thereto are removed simply by elevating the container from the apparatus.

What I claim is:—

1. In a butter cutting machine, a support having parallel guides; a butter bar container one end of which is open, rotatably and removably mounted in said support, and having opposite longitudinal slots; a bracket slidably mounted on said guides; a feed-screw with which said bracket is detachably engaged and actuated thereby; a plunger longitudinally movable in said container; a ring encompassing the container, connected through the slots therein with said plunger, and detachably engaged by said bracket; means within the open end of said container to cause a butter bar when extruded through its open end to become sliced longitudinally; a stationary wire disposed adjacent the open end of the container to cause the extruded parts of said bar to be sliced transversely to form pats; a stripper for deflecting said pats as formed; and driving means relating the stripper, the feed-screw and the container, to effect operation thereof concurrently.

2. In a butter cutting machine, a support having parallel guides; a butter bar container one end of which is open, rotatably and removably mounted in said support, and having opposite longitudinal slots; a bracket slidably mounted on said guides; a feed-screw with which said bracket is detachably engaged and actuated thereby; a plunger longitudinally movable in said container; a ring encompassing the container, connected through the slots therein with said plunger, and detachably engaged by said bracket; means within the open end of said container to cause a butter bar when extruded through its open end to become sliced longitudinally; a stationary wire disposed adjacent the open end of the container to cause the extruded parts of said bar to be sliced transversely to form pats; and driving means for concurrently actuating the feed screw and container.

3. In a butter cutting machine, a support; a butter bar container one end of which is open, rotatably mounted in said support; a bracket slidably mounted in said support longitudinally with respect to the axis of said container; a feed-screw with which said bracket is detachably engaged and actuated thereby; a plunger in said container; a ring encompassing the container and having operable connections with the plunger, there being longitudinal slots in the container through which said connections extend; means disposed so as to cause a butter bar as it is extruded through the open end of the container to be longitudinally and laterally sliced to form pats; and means associated with the feed-screw and the container for actuating them concurrently.

4. In a butter cutting machine; a support; a butter bar container one end of which is open, rotatably mounted in said support; a bracket movable in said support longitudinally with respect to said container; means for actuating said container and bracket concurrently; a plunger in said container; a mechanism operably relating said plunger and bracket so that as the bracket is moved longitudinally, the plunger is actuated accordingly, said mechanism and container being bodily removable from said bracket and support; and slicing means disposed so as to form pats of a butter bar as it is extruded through the open end of the container by the action of said plunger.

5. In a butter cutting machine, a support; a rotatable container in said support; means for slicing a butter bar as it is extruded from the discharge end of the container; a plunger in said container; a longitudinally sliding and pivotally movable bracket in said support; a feed-screw for actuating said bracket and from which said bracket is detachable upon pivotal movement thereof; means operably relating the bracket with the plunger; and means for actuating the feed-screw and container.

In testimony whereof I affix my signature.

HENRY J. OUTCELT.